United States Patent [19]

Vandiver et al.

[11] Patent Number: 5,526,906
[45] Date of Patent: Jun. 18, 1996

[54] METHOD AND APPARATUS FOR CONNECTING A SLENDER STRUCTURE TO A REFERENCE BODY AND FOR SUPPRESSING THE VIBRATIONS OF SUCH SLENDER STRUCTURES

[75] Inventors: J. Kim Vandiver, Lexington; Li Li, Cambridge, both of Mass.

[73] Assignee: Massachusetts Institute of Technology, Cambridge, Mass.

[21] Appl. No.: 343,795

[22] Filed: Nov. 22, 1994

Related U.S. Application Data

[63] Continuation of Ser. No. 268,871, Jun. 30, 1994, abandoned, which is a continuation of Ser. No. 934,590, Aug. 24, 1992, abandoned.

[51] Int. Cl.$^6$ .................................................... F16F 15/02
[52] U.S. Cl. .............................................. 188/380; 188/378
[58] Field of Search ......................... 188/378, 379, 188/380; 74/96, 61, 25; 174/42; 24/133, 132 R; 14/18, 19, 20, 21, 22

[56] References Cited

U.S. PATENT DOCUMENTS

| | | | |
|---|---|---|---|
| 2,618,713 | 11/1952 | Blinn | 74/96 |
| 3,445,080 | 5/1969 | Flannelly | 188/378 |
| 3,782,506 | 1/1974 | Yarrington | 188/378 |
| 4,391,125 | 7/1983 | Nigol et al. | 174/42 |
| 4,779,712 | 10/1988 | Peterlsak | 188/379 |

FOREIGN PATENT DOCUMENTS

| | | | |
|---|---|---|---|
| 2751690 | 5/1979 | Germany | 174/42 |
| 0138540 | 10/1981 | Japan | 188/379 |
| 0577332 | 10/1977 | U.S.S.R. | 188/378 |

OTHER PUBLICATIONS

E. R. Wildemann, "Reducton of the Flow–Induced Vibration Response of a Marine Cable by Altering the Cable Boundary Conditions," Master's thesis at The Massachusetts Institute of Technology, Jun. 1983.

James D. Hart, Richard Sause, G. Wyche Ford and Dennis G. Row, "Mitigation of Wind Induced Vibration of Arctic Pipeline System," Proceedings of the 11th International Conference on Offshore Mechanics and Artic Engineering, Ed. S. T. Barbas et al., Book No. H0746A 1992, pp.169–180.

A. S. Richardson, "Vibration of Bundled and Single Conductors: A Comparative Case Study," Electric Power Systems Reseach, 18 (1990).

Brochure from Research Consultin Associates, Jan. 1989.

Electric Light & Power, pp. 66–67, "A Guide to Available Aeolian Vibration Damping Devices," (1972).

Primary Examiner—Matthew C. Graham
Attorney, Agent, or Firm—Steven J. Weissburg

[57] ABSTRACT

The invention is an apparatus for connecting a slender structure to a reference body. The apparatus comprises a link, that is connected to one end of the slender structure. The link is connected with a hinge at a second point of the link to the reference body with at least one degree of rotational freedom. A damper for damping motion of the link through at least one of the link's degrees of rotational freedom is connected between the link at a third point and the reference body. The device suppresses vibration waves travelling in the slender structure. A spring for resisting motion through the degree of rotational freedom may also be beneficially provided. The link, spring and damper may all act through one or two degrees of rotational freedom. The hinge can be either a pivot or a flex joint. The invention includes a method of selecting the parameters of the link, damper and spring assembly to optimize the suppression of vibration.

27 Claims, 10 Drawing Sheets

मेथड AND APPARATUS FOR
CONNECTING A SLENDER STRUCTURE TO
A REFERENCE BODY AND FOR
SUPPRESSING THE VIBRATIONS OF SUCH
SLENDER STRUCTURES

This is a continuation of application Ser. No. 08/268,871 filed on Jun. 30, 1994, now abandoned, which is a continuation of application Ser. No. 07/934,590 filed on Aug. 24, 1992, now abandoned.

The present invention relates in general to the field of vibration control. It relates more specifically to a method and an apparatus for connecting a slender structure to a reference body and for controlling vibrations in such slender structures. It relates most specifically to a method and an apparatus for connecting slender structures to a reference body and for controlling transverse vibrations in slender structures, such as nautical towing lines, high tension wires, elevator cables and the like.

BACKGROUND OF THE INVENTION

Slender structures that are subject to mechanical excitations tend to exhibit transverse waves traveling along their lengths. A "slender" structure is one having a length that is relatively large, as compared to its size in any perpendicular dimension. The well known example of a guitar string experiences transverse waves. A guitar string is fixed at both ends. If the string is pulled from its rest position transverse to its length, and released, the string vibrates back and forth from one side of the rest position to the other. This is an example of lightly damped free vibration. For the guitar string such vibration occurs at particular frequencies, the natural frequencies in cycles per second or Hertz ("Hz"), which are given by the following equation:

$$N_n = \frac{n}{2L} \sqrt{T/\rho_c} \qquad n = 1, 2, 3, \ldots \qquad (1)$$

where: T=tension (in units of force); $\rho_c$=mass per unit length; L=length of string between fixed points; and n is an integer. The lowest natural frequency (n=1) is referred to as the "fundamental" frequency. The other natural frequencies are often referred to as "higher harmonic" frequencies. The sound heard upon plucking a guitar string includes the fundamental and several of the higher harmonic frequencies.

Strings under tension also support traveling waves, which one may generate and watch by periodically shaking one end of a long rope under low tension. In fact, the side-to-side motion of a guitar string can be represented mathematically as the sum of two waves of equal amplitude and frequency traveling in opposite directions. The sum of the two produces what is referred to as a "standing wave."

Standing waves are also produced when a traveling wave of a particular frequency and amplitude encounters a fixed end (a "termination"). There, the wave is reflected, producing a wave traveling in the opposite direction. The sum of the incident and reflected waves create a standing wave pattern, which is usually of greater amplitude than the incident wave and may lead to structural damage. One of the important features of the present invention is that it prevents waves from being reflected. A guitar string exhibits nearly perfect reflections at its terminations.

Inspection of equation (1) given above shows that for the natural frequencies, the length of the string is an integer multiple of half wave lengths. (A wave length λ is the distance from the crest of one wave to the crest of the next, just as one sees on the surface of the ocean.) The fundamental natural frequency of a string is the frequency having a wavelength that is exactly equal to twice the length of the string.

The notion of natural frequencies is important in the context of this invention, because it is very easy to create large amplitude vibration of a tensioned string, cable, rope, ribbon or similar slender structure by providing an external periodic exciting force at one of the natural frequencies of the structure. This large amplitude response is due to an effect known as "dynamic amplification." One way to diminish or eliminate dynamic amplification is to reduce the efficiency of wave reflection at terminations. The present invention absorbs, rather than reflects the energy in waves which encounter the terminations or boundaries.

The guitar string has been used as an instructive example. The principle is also applicable to ship anchor lines, power transmission cables, and even drilling pipe suspended beneath a ship. In fact, it is applicable to any long slender structure capable of supporting traveling waves which cause movement perpendicular to the long axis of the structure, such as the lateral motion of a cable being towed through the water, or the vibration of an above-ground pipeline exposed to the wind.

It is well understood that for most mechanical structures, such as elevator cables, bridge suspension cables, high tension wires and nautical tow lines, it is undesirable to subject the structure to excitation forces that are near to a natural frequency. If that occurs, the structure may exceed its desired safe operating range. Sometimes, the vibration may lead to structural failure, with the structure vibrating free of its moorings, or experiencing fatigue failure. For this reason, engineers examine the frequencies of likely excitations, such as would be caused by traffic, normal use, earthquakes, wind, currents in water, ocean waves, etc., and try to design the structure and components thereof so that their natural frequencies differ greatly from any excitation frequencies that are likely to arise. This is not always possible and sometimes it is necessary to deal directly with the coincidence of exciting forces and natural frequencies. The problem is prevalent in connection with the task of towing objects through a fluid, such as in the water or air behind a ship or an airplane.

FIG. 1 shows schematically a ship 102 that is towing an object 104, such as a sonar sensor, magnetometer, or underwater camera, etc., in a direction indicated by an arrow V, at a velocity v through the water. The tow line or tow cable 106 is terminated at the boat at 108 and at the towed object 104 at 110, such that the ends of the tow line can not move with respect to either the ship or the towed object. In other words, its ends are fixed with respect to these objects, just like a guitar string, as discussed above. These objects are referred to below as "reference bodies." The ship is further classified as a stationary reference body, because it does not move in response to vibrations in the slender structure. Some towed objects are referred to as "movable reference bodies, because they are small enough so that they do move in response to vibrations in the slender structure. The principals of the invention apply to connections between slender structures and both types of reference bodies.

The tow line 106 experiences a tension T along its length, which is a function of the weight and buoyancy of the tow line and of the towed object 104, and the drag caused by the interaction of the tow line and the water through which it moves. The drag is affected by many things, including the diameter and surface characteristics of the tow line (i.e. smooth, fuzzy, ridged, etc.), the viscosity and density of the water and the velocity of the tow line through the water.

As a result of the flow of water around the tow line, eddies 112, also known as vortices, are shed in the wake of the tow line, i.e. behind it as it is pulled in direction V. The formation of the eddies causes transverse, periodic, lift forces on the tow line. If the eddies become correlated with each other with respect to time and their location along the length of the tow line, the resulting net force increases, leading to greater vibration. The frequency of the lift force, $N_s$, may be predicted from the empirical relationship given below, $$N_s = \frac{S_t v}{D} \qquad (2)$$

where: $N_s$=the vortex shedding frequency in Hz; v=the velocity of the fluid perpendicular to the cable; D=the diameter of the cable; and $S_t$=the Strouhal number, which is an empirical value that is known for most conditions. For circular cylinders $S_t$ is between 0.1 and 0.3 for most circumstances relevant here. See generally Blevins, *Flow Induced Vibration*, Van Nostrand Reinhold Co., 1977.

Large amplitude vibration results when the lift force frequency $N_s$ given above coincides with a natural frequency of the structure. This is because the standing wave motion of the structure at its natural frequency is able to synchronize the formation of the vortices and hence the lift forces along the length of the cylinder. This results in much larger motion than is possible with uncorrelated shedding of many vortex cells along the length. This phenomena is referred to as "lockin." However, it is not necessary for the vortex shedding frequency as given by the equation above to exactly equal a natural frequency. If the shedding frequency is within approximately +/−25% of a natural frequency, the shedding frequency may shift to the nearest natural frequency of the tow line, and the otherwise non-correlated lift and drag forces may become correlated along the entire length of the cable, resulting in substantial vibration.

Uncorrelated lift forces cause much less vibration than correlated lift forces resulting from lockin. Lockin may occur not only at the fundamental natural frequency of the tow line, but also at higher natural frequencies. Thus, as the fluid velocity changes, the lockin phenomena may jump from one natural frequency to the next. It is possible for a tow line to be continuously "locked in" to the eddy disturbances, regardless of the speed at which the tow line moves through the fluid, or the tension applied to the tow line. In cases like this it is usually impossible to reduce vibration by attempting to avoid natural frequencies.

Vibrations cause many problems. Principally, they add to the drag force between the fluid and the tow line, thereby requiring more power to attain the desired speed than would be necessary absent the vibrations. If the vibration becomes large enough, the tow line may fail due to abrasion or fatigue at its attachment points, with the ship or with the towed object, resulting in loss or damage of the towed object. Often, the device being towed is a sonar or other data gathering instrument. The vibrations produce noise that is received by the instrument, thereby obscuring the signal sought to be measured. The problem of flow-induced vibration is discussed in general in the text by Blevins, previously cited.

The present invention prevents the formation of standing waves, by absorbing rather than reflecting incident wave energy at the terminations of the towline, thus preventing lockin and reducing vibration. Many attempts have been made to overcome this nautical instance of the general problem which the invention addresses.

One general class of solutions tries to minimize the eddies that normally form, by attaching airfoil shaped fairings along the length of the tow line. The fairings, which are clipped onto the line, prevent the eddies from forming and thereby eliminate the periodic excitation. This approach has many drawbacks. Tow lines are normally stored on a roll, which is formed by winching a length of line around a drum. In use, lengths of tow line are spooled off from the drum, or winched back onto the drum as needed to change the length of the tow line. The fairings can not be attached to the tow line when it is winched up through the various guides and pulleys necessary to handle the lines. Further, they cannot remain attached to the line when it is rolled onto the drum. Thus, they must be attached as the tow line is let out, and removed as the tow line is reeled in. This presents a cumbersome and sometimes dangerous task. Further, the fairings must be very large if the tow line is of a large diameter. This presents significant handling, manufacturing, storage and safety complications. In applications relating to aircraft, the added weight of the fairings is also undesirable.

A second general class of solutions tries to reduce transverse vibrations by attaching long hair-like filaments to the entire surface of the tow line (so that it resembles a normal tow line covered with bristles or spaghetti). A principal problem with this general type of tow line is that it greatly increases the drag which must be overcome by the ship motor. It also makes winding the tow line on a drum and passing it through a pulley more difficult but sometimes not impossible. Addition of other structures, such as plastic pennants or flags has also been attempted. Another type of special tow line is made with helical strakes or ridges wrapped along the length of the tow line. The strakes tend to disorganize the forming eddies so that they are not correlated along the length of the tow line, thus reducing the periodic nature of the transverse forces caused by the eddies. A common embodiment of such strakes used to overcome a related problem can be seen spiraling up around smoke stacks, to minimize the effect of wind forces on the smoke stacks. In water such strakes reduce but generally do not sufficiently eliminate the problem.

A third class of solutions which is used in wind driven vibration problems, but not in water, is the "Stockbridge Damper." This is a device often seen hanging from the mid spans of high voltage power lines. Mechanically it is simply a mass suspended from the cable by a spring and damping element in parallel. The mass is free to move and acts as what is known as a dynamic absorber. See generally, J. P. Den Hartog, *Mechanical Vibrations*, p.93, (1956). The Stockbridge Damper absorbs energy from the waves in the cable in a band of frequencies near the natural frequency of the mass and spring system. It will not operate at a non-moving termination and it is not optimized so as to minimize the reflection coefficient. It does, under some circumstances, reduce vibration in wind driven cases. However, it is fundamentally different from the present invention.

The example of a tow line has been used here. The problem and typical solutions are applicable in many other structures including guy wires on towers and bridges, expanses of power wires, pipelines, etc. The problem is also present on oceanographic moorings, offshore oil drilling risers and marine pipelines.

DESCRIPTION OF THE FIGURES OF THE DRAWING

FIG. 4b shows schematically in cross-section a front view the idealized apparatus of the prior art shown in FIG. 4a.

THEORETICAL BACKGROUND OF THE INVENTION

Figure 1A:
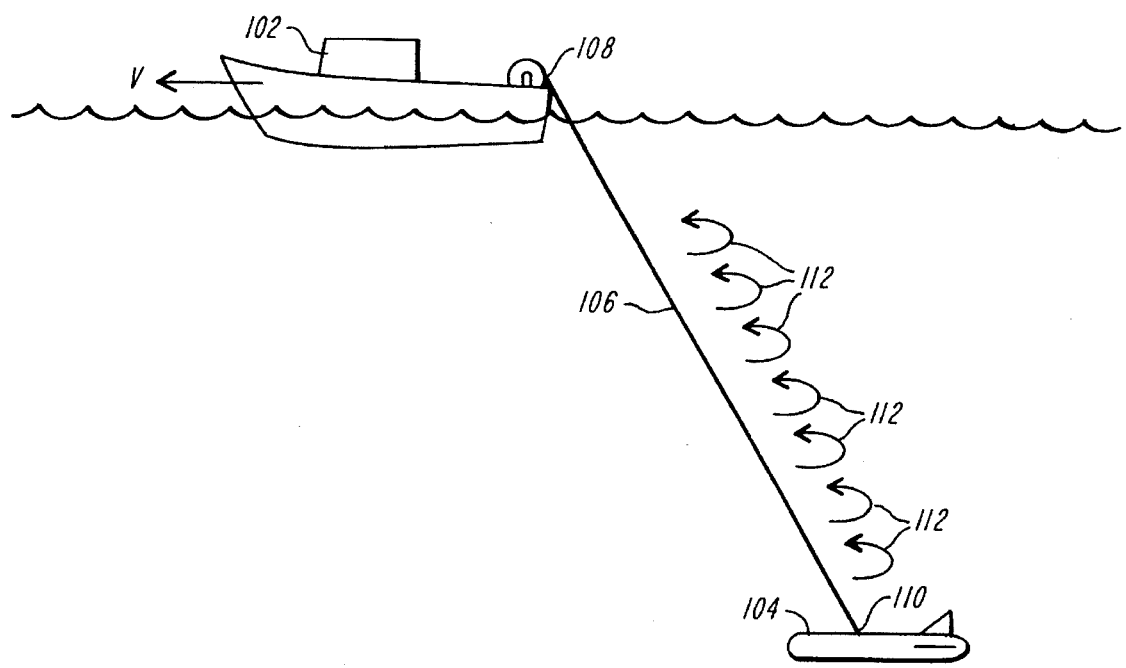
FIG. 1a shows schematically a problem that the invention addresses, with a ship towing a load, with eddies being shed by the tow line.

It is well known that the reflection of waves at a boundary depends upon the impedance of the boundary compared to the impedance of the medium in which the wave has been traveling. This is true for electro-magnetic and acoustic waves, as well as for mechanical waves such as those traveling on a taut cable or string as has been described here. See generally, Kinsler and Frey, *Fundamentals of Acoustics,* John Wiley & Son, (1962). By adjusting the impedance of the boundary one may cause the waves to be either absorbed or reflected by the boundary. Although the theory is well known, practical devices which may give the boundary the desired impedance are often difficult to achieve. To date, this theory has not been successfully applied to the problem of a tow line or similar slender structure.

Before proceeding with the description of the invention, it is first helpful to define the term "impedance" as it applies to wave transmission on long slender structures, such as strings and cables, and as it applies to mechanical elements to which the strings and cables are connected. In this context, impedance is defined as follows: If a mechanical system is driven by an oscillating sinusoidal force and responds with a steady state sinusoidal velocity at the same frequency as the driving force, then the impedance of the mechanical system being excited is simply the ratio between the exciting force and the velocity. Hence the sinusoidal steady state oscillatory force required to drive the system at any particular level of oscillating velocity is simply the product of the desired velocity and the impedance.

$$\text{Impedance} = Z = F/v \text{ and therefore Force} = Z \cdot v \tag{3}$$

One way to reduce the mechanical vibration of long slender structures such as cables, is to prevent reflection of waves at the boundaries or termination points of the cable. In terms of impedance, this may be accomplished by inventing a mechanical termination which has the same mechanical impedance as the cable. There has been one prior unsuccessful attempt to do this with respect to the nautical tow line type problem. The attempt is described in a master's thesis, by E. R. Wildemann, "Reduction of the Flow-Induced Vibration Response of a Marine Cable by Altering the Cable Boundary Conditions," Massachusetts Institute of Technology, June 1983. This reference describes the theory and the properties of an ideal termination. However the author failed to design a practical or workable device. This thesis research project was supervised by one of the inventors herein, and is incorporated fully herein by reference.

If there is no reflection at the boundary or termination, then there is no standing wave behavior, and, consequently, the slender structure in combination with the boundary has no natural frequencies. Thus, external exciting forces do not lead to dynamically amplified vibration response. When vortex shedding is the excitation mechanism, standing waves and therefore the lockin phenomenon are prevented, resulting in much reduced response.

Figure 4A:
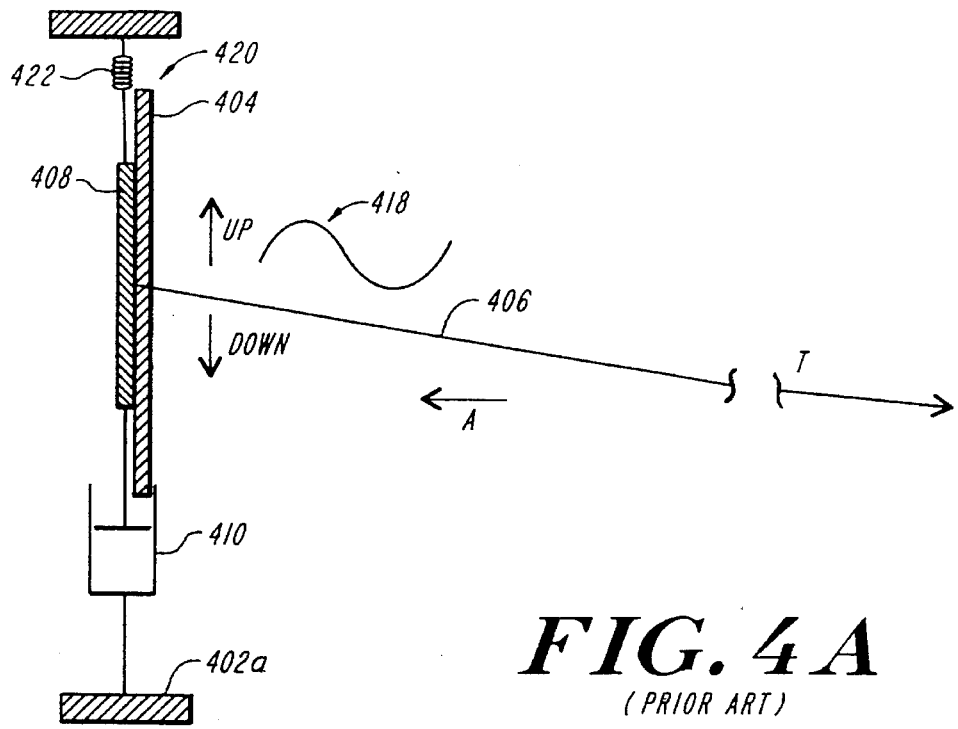
FIG. 4a shows schematically in cross-sectional side view an idealized apparatus of the prior art.
Figure 4B:
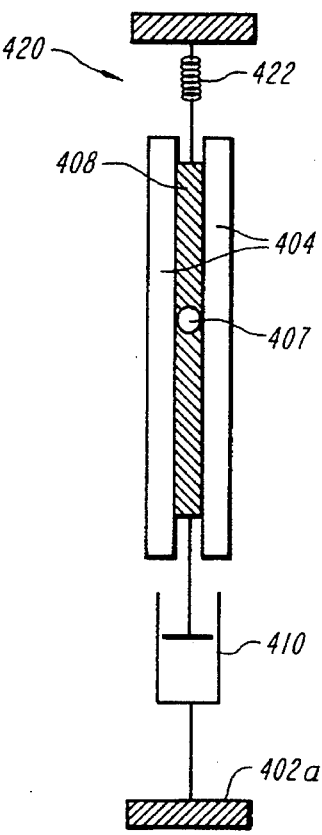

An idealized apparatus, functionally identical to what is disclosed in the Wildemann reference at pp. 29–32, is shown schematically in cross-section in FIG. 4a, and in an elevation view in FIG. 4b. A slender structure, such as a tow line 406, extends in one direction, to a fixed point (not shown) or to infinity. In the other direction, the tow line is attached at 407 pivotally to a frictionless, slidable body 408, which may have some mass. Body 408 is constrained in some fashion, so that it can move generally transverse to the length of the slender member 406, but not longitudinally of the slender member. This is shown schematically in FIG. 4a by retaining the body 408 against grounded guides 404.

Alternatively, rather than sliding, body 408 can be fitted with wheels constrained not to move longitudinally of the slender member 406 (as shown in Wildemann), which permit it to roll transverse of the slender member 406. The body 408 is connected to ground (indicated at 402a) through a damping element 410 and a spring 422. As used in connection with the idealized apparatus and the apparatus of the invention, a linear damping element is defined as an element that responds to a force, F, applied through its ends according to the following relationship:

$$F=R\dot{y}, \quad (4)$$

where R is the damping coefficient (in units of N–sec/m in the metric system and of lb(force)–sec/ft in the British engineering system). As shown in FIG. 3b, y is the displacement the damping device experiences from its rest position and $\dot{y}$ is the rate of change of y, also known as the velocity. The damping device responds by opposing the applied force, according to the same relation, whether F is positive or negative, with the sign of $\dot{y}$ being the same as that of the applied force. A damping element is also referred to as a "dissipative" element, or a "dashpot."

Figure 3A:
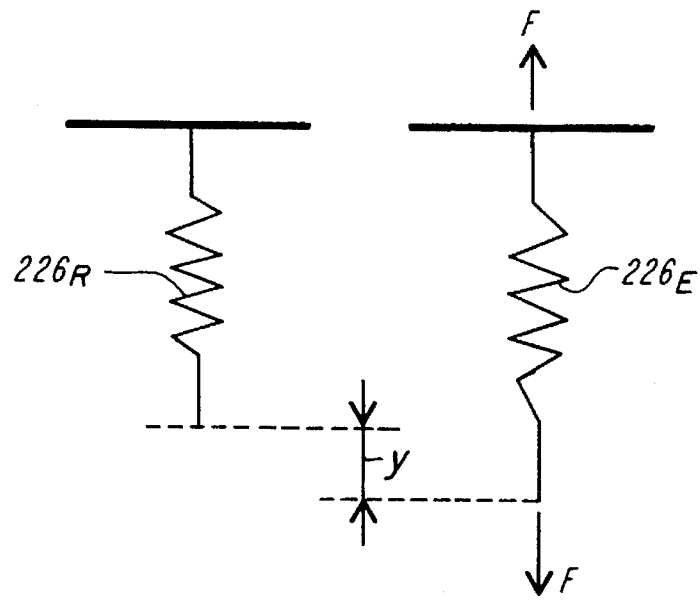
FIG. 3a shows schematically the operation of an idealized spring element, which need not have a linear force to displacement relationship.
Figure 3B:
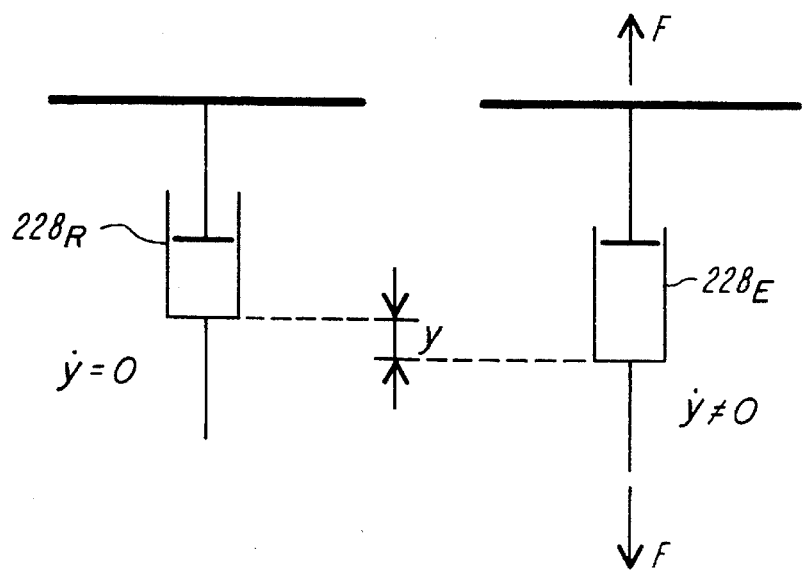
FIG. 3b shows schematically the operation of an idealized dissipative element which need not have a linear force to velocity relationship. In reality, the spring shown in FIG. 3a and the dissipative element shown in FIG. 3b may be combined in one device.

As used in connection with the idealized apparatus and the apparatus of the invention, a linear spring element is defined as an element that responds to a force F applied through its ends according to the following relationship:

$$F=ky, \quad (5)$$

where k is a spring property, that is typically constant over the expected range of operation under examination and y is the displacement the spring experiences from its rest position, as shown in FIG. 3a. Shown in FIG. 3a, the spring 226R is at rest and the spring 226E is extended under action of force F. The spring responds to always oppose the applied force, according to the same relationship whether the force F is applied to extend the spring, or to compress it. If the force F is in the negative direction, the displacement y is negative, and the spring compresses. A spring element is also sometimes referred to as a "stiffness" element.

A train of waves 418 that the Wildman device is designed to absorb is shown in FIG. 4 advancing in the direction of the arrow A. Thus, as the wave approaches the interface between the slender tow line 406 and the idealized apparatus, it will in general cause the mass of the ideal device to oscillate in accordance with the law of physics, which states that the mass times the acceleration of an object must equal the sum of the external forces acting on the object. In this case the transverse external forces are those caused by the spring, the damper, and the tension of the cable connected to the mass. If the impedance of the mass, spring, and dashpot of the idealized apparatus can be made to equal that of the cable, then the waves incident on the apparatus will be completely absorbed and not reflected back into the cable.

It is well known that the impedance at the end of an infinitely long cable under tension is given by $Z_c = \sqrt{T\rho_c} = \rho_c C$, where T is the tension in the member, $\rho_c$ is the mass per unit length of the member and C is the speed of wave propagation. This impedance is purely resistive and is independent of the external exciting forces. Thus, at the end of a semi-infinite cable under tension, the magnitude of the sinusoidal force, F, necessary to generate an oscillatory velocity of magnitude v is given by $F=Z_c^*v$.

The input impedance $Z_m$ of a combination of elements, such as the idealized apparatus 420, is slightly more complicated and is as follows:

$$Z_m = R + i\omega(m - k/\omega^2), \quad (6)$$

where R is the characteristic constant of the damper 410, m is the mass of the slider 407, k is the constant of spring 422 and $\omega$ is the frequency of vibration in radians per second.

Evaluation of the impedance $Z_c$ of the slender member will produce a specific number, for a given tension T and linear density $\rho_c$. Similarly, evaluation of the impedance $Z_m$ of the apparatus will produce a specific number, for a given set of mechanical parameters m, k and R and a frequency $\omega$. The task of engineering design is to choose an apparatus that can be constructed of elements having the requisite parameters, so that under normal loading conditions of speed, mass being towed, tow line density, etc., it is possible to match the impedances, i.e., render the specific numbers for each to be roughly equal at the frequency of expected external excitation.

Another way to understand how the ideal apparatus operates is that, because the impedances are closely matched, the apparatus behaves as if it were simply a continuation of the tow line on to infinity. Thus, just as there is no reflection of a wave as it passes from one point of a continuous uniform cable to another point, there is no reflection of the wave when it passes from the tow line to the apparatus.

The idealized apparatus can be imagined so that over a broad range of frequencies the impedance of the apparatus will match that of the slender member. However, the idealized device can not be constructed because it requires both a very weak spring and nearly perfect alignment. In other words, the direction of the tension and the at rest axis of the cable must be almost perfectly perpendicular to the direction in which the mass 408 is permitted to travel. If not, the mass 408 will collapse the spring against the ground 402 and the apparatus will cease to function. With a stronger spring, the Wildemann device can be made to work over a limited frequency range. However, it still requires careful alignment of perpendicularity between the towline 406 and the motion of slider 408, which is frequently not possible under at sea conditions.

OBJECTS OF THE INVENTION

Thus, the several objects of the invention include to provide a method and apparatus to control vibration of slender structures: without greatly increasing the drag forces between such structures and the fluids surrounding them; without adding cumbersome or bulky elements to the structures themselves; without unduly adding to the weight or complexity of such structures; using an apparatus that can be adjusted to various tensions experienced by the structure and natural frequencies of the structure; which is simple to manufacture and deploy; so that the impedance of the apparatus is such that waves encountering the apparatus are absorbed and not reflected back into the long slender structure.

BRIEF DESCRIPTION OF THE INVENTION

In a first preferred embodiment, the invention is an apparatus for connecting a slender structure to a reference body. The apparatus comprises a link that is connected to one end of the slender structure. The link is connected with a hinge at a second point of the link to the reference body with at least one degree of rotational freedom. A means for damping motion of the link through at least one of the link's degrees of rotational freedom is connected between the link at a third point and the reference body.

In a second preferred embodiment, the invention is a method for connecting a slender structure to a reference body. The method includes the steps of connecting a link to one end of the slender structure and connecting the link at a second point to the reference body by means of a hinge with at least one degree of rotational freedom. The method also includes the step of connecting, between the link at a third point and the reference body, a means for damping motion of the link through the at least one degree of rotational freedom.

In a third preferred embodiment, the invention is a method for suppressing vibration waves traveling at speed C in a slender structure experiencing a tension T and having a mass per unit length $\rho_c$, connected to a reference body. The method includes the steps of connecting a link at a first point to one end of the slender structure and connecting with a hinge the link at a second point of the link to the reference body with at least one degree of rotational freedom. The distance between the first point and the second point is designated L. The method also includes the step of connecting, between the link at a third point and the reference body, a means for damping motion of the link through at least one of the link's degrees of freedom, the distance between the second point and the third point being designated b and the damping coefficient of the means for damping being designated R. Vibration is suppressed by maintaining the value of the ratio $Rb^2/L^2$ within a preselected degree of deviation from the value of $\rho_c C$.

In a fourth preferred embodiment, the invention is a method for suppressing vibration waves traveling at speed C in a slender structure, having a mass per unit length $\rho_c$, and connected to a reference body. The method includes the steps of connecting a link to one end of the slender structure and connecting with a hinge the link at a second point of the link to the reference body with at least one degree of rotational freedom, the distance between the first point and the second point being designated L and the mass moment of inertia of the link with respect to the pivot point being designated $I_0$. The method further includes the steps of connecting a means for damping motion of the link through at least one of the link's degrees of rotational freedom between the link at a third point and the reference body, the distance between the second point and the third point being designated b and the damping coefficient of the means for damping being designated R. A means for applying a spring stiffness resisting motion through at least one of the link's degrees of rotational freedom is connected between a fourth point and the reference body, the distance between the fourth point and the second point being designated a, the spring coefficient of the means for applying a spring stiffness being designated K. Vibration waves are suppressed by choosing the parameters to maximize the value of a transmission coefficient based on the foregoing parameters.

In a fifth preferred embodiment, the invention is a method for connecting a movable reference body to one end of a first slender structure and to one end of a second slender structure. The method comprises the steps of connecting a first link to one end of the first slender structure and connecting with a hinge the first link at a second point of the first link to the reference body, with at least one degree of rotational freedom. The method also includes the steps of connecting a means for damping motion of the first link through at least one of the link's degrees of rotational freedom to the first link at a third point and to the reference body. Similar steps are conducted with respect to a second link, which is connected to one end of the second slender structure.

DETAILED DESCRIPTION OF PREFERRED EMBODIMENTS OF THE INVENTION

The apparatus of the invention provides a buildable, practical solution to the general problem. A first preferred embodiment of the invention is shown schematically in FIG. 2a. A slender structure, such as a tow line 206, extends in one direction to a fixed point (not shown) a finite distance away, or to infinity. In the other direction it is attached pivotally (also referred to herein as "pinned") to a portion of an embodiment of the apparatus of the invention, designated generally at 220.

Figure 1B:
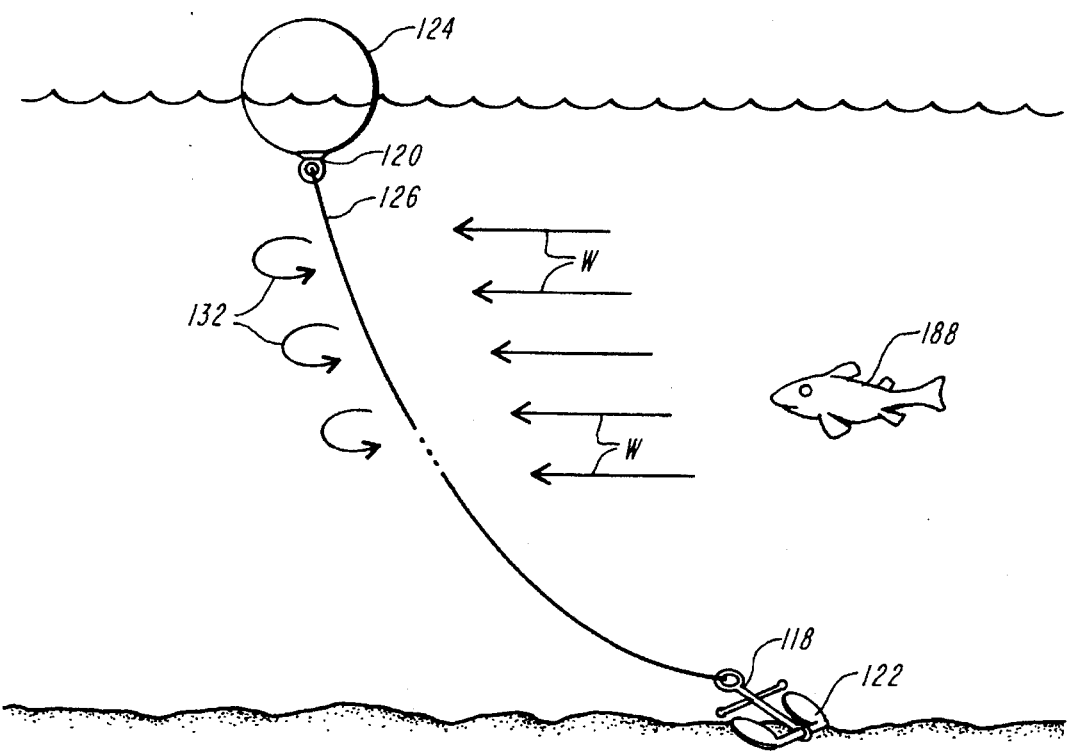
FIG. 1b shows schematically a related problem addressed by the invention, a buoyant load, moored by a line to an anchor, with moving water surrounding the anchor line, thus again shedding eddies.
Figure 1C:
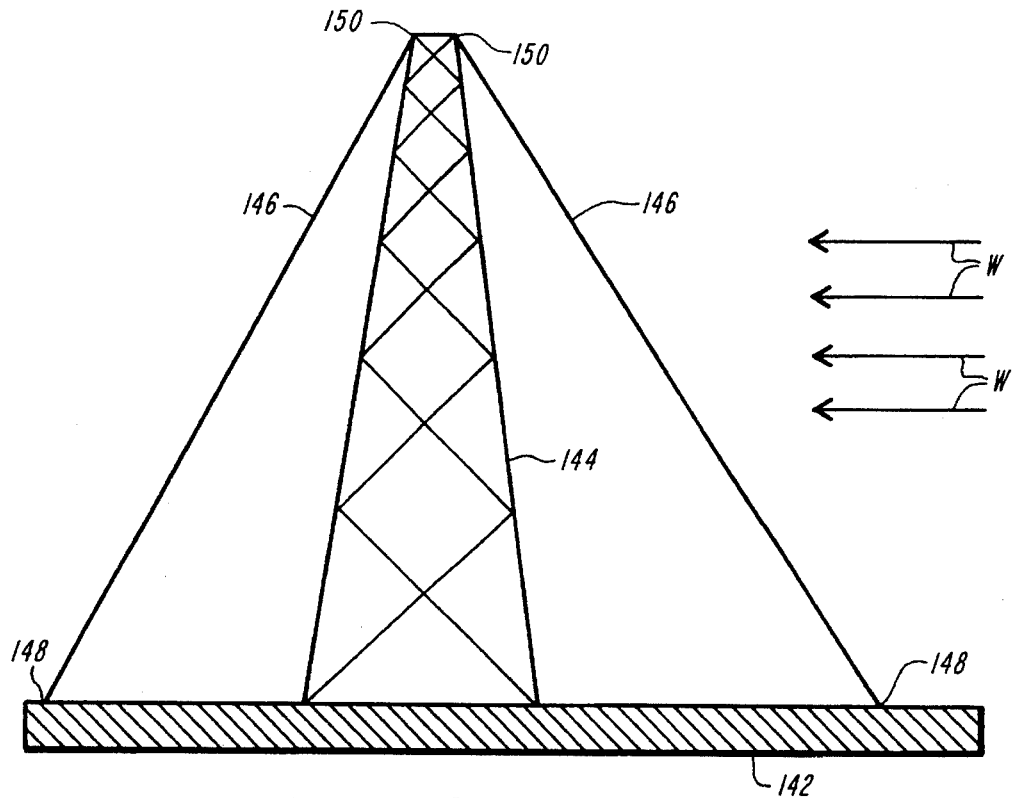
FIG. 1c shows schematically a related problem addressed by the invention, of a tower, such as for television transmission, anchored through guy wires to the ground, with air blowing by the guy wires, thus shedding eddies.

In a basic embodiment (there are many possible variations, as outlined below), the apparatus consists of a substantially rigid mass 222, which rotates about a pivot 224. The rigid mass, also called a "link," has one degree of rotational freedom such that it can move in response to a component of the vibration in the slender structure, referred to below as a "cable." One point, typically near the end of the rigid mass 222, is attached to the end of the tow line 206. The rigid mass 222 is attached by a pivot 224 to the ground 230, which is a ship, in the application of a ship towing a tow line, or as shown in FIG. 1c, a concrete foundation 142 in the case of a guy wire 146 that supports a structure such as the antenna 144.

Figure 1D:
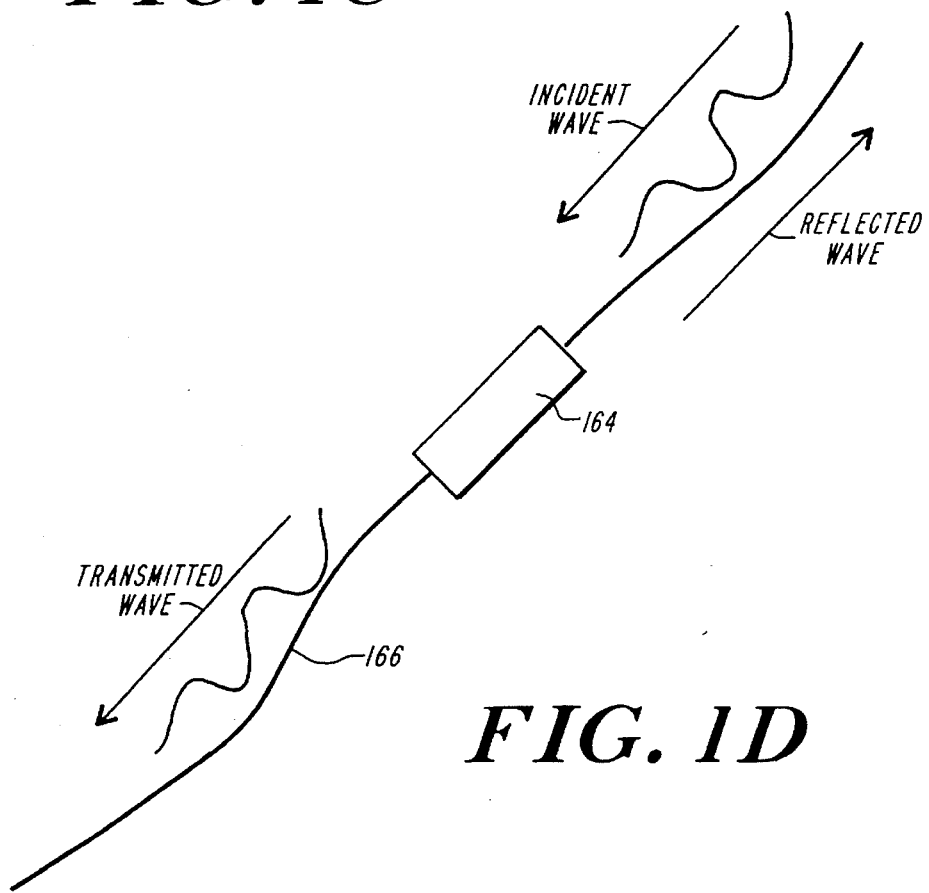
FIG. 1d shows schematically a related problem addressed by the invention, of an object attached between two lengths of cable and subject to vibration caused by waves propagating on the cable.

In the simplest application the ship or concrete foundation or towed object are assumed to be so large and massive that they do not move in response to vibrations in the cable. In more advanced applications such as a small object being towed on the end of a cable, as shown in FIG. 1a, or an instrument connected on both ends to cables as shown in FIG. 1d, the invention is also useful, however the selection of the mechanical properties of the apparatus is more complicated. The simple application is described here, in which the apparatus is presumed attached to a large non-moving object. Generalization to the more complicated situations is developed afterwards.

The rigid mass 222 has one degree of rotational freedom around the pivot 224 in a plane into which a component of the tow line oscillation can be resolved, in the directions indicated by double ended arrow P. The mass has a characteristic mass moment of inertia $I_o$ about the axis of rotation at the pivot 224. The mass moment of inertia depends upon the mass distribution with respect to the pivot point 224.

A spring 226 and a damper 228, operating in parallel are attached to the rigid mass 222 at distances a and b from the pivot 224. The spring and damper may be connected to the rigid link together on either side, or opposite sides, of the pivot point 224 with respect to the ends of link 222, and may be separate units or combined into one mechanical device. The spring and damper act in parallel in resisting the motion of the link. The spring and damper may be distributed along the link as would for example be the case if a piece of elastomeric material, such as rubber, were connected to both the link and the ground. (By "operating in parallel," it is meant that the spring 226 and damping element 228 experience a proportional change in compression or extension (although possibly of opposite signs) for motions of the link 227. For instance, the spring 286 and damper as arranged in FIG. 2g, are also "operating in parallel," although they are connected to opposite faces of the rotating link. Parallel operation is distinguished from "series operation," where, rather than the two elements experiencing proportional displacements, they would experience equal force (such as if the elements were connected end to end as shown in FIG. 2h).

Both the spring 226 and damper 228 are connected to the rigid mass 222 and to the ground 230 so as to provide a torque with respect to the pivot point 224, thereby resisting the rotation of the rigid body. The mass moment of inertia $I_o$, the distances from the pivot to the cable connection point and to the spring and damper, as well as the mechanical properties of the spring and damper must all be taken into account when evaluating the impedance of the apparatus.

As the vibration of most cables must be described by resolving the vibrations into two orthogonal dimensions, in other preferred embodiments of the invention, the pivot would have at least two degrees of rotational freedom, such as a ball and socket joint, universal joint or the equivalent, to allow the mass 222 to pivot such that its end follows the two-dimensional vibrations. In such a case, dampers and springs would be provided to oppose the motion of the mass through both degrees of freedom. Such a set up is shown schematically in FIG. 2e.

Figure 2A:
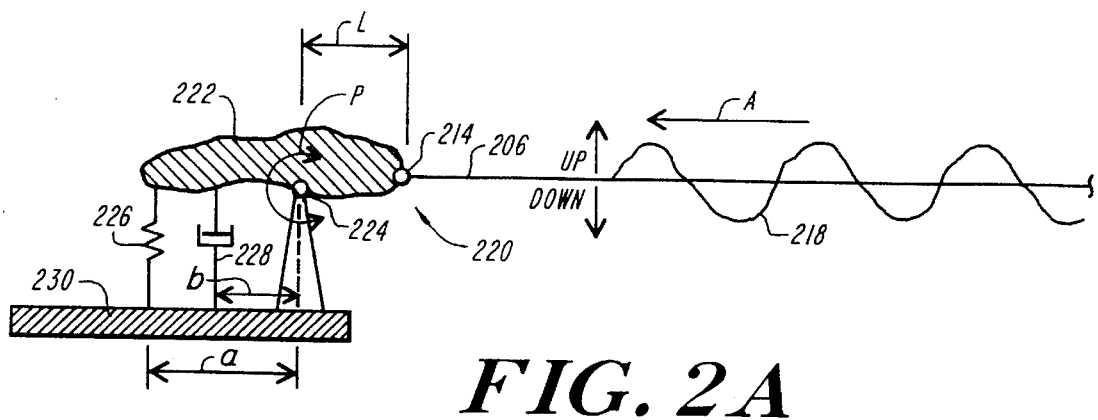
FIG. 2a shows schematically the modeling of an embodiment of the apparatus of the invention, in a neutral position.
Figure 2B:
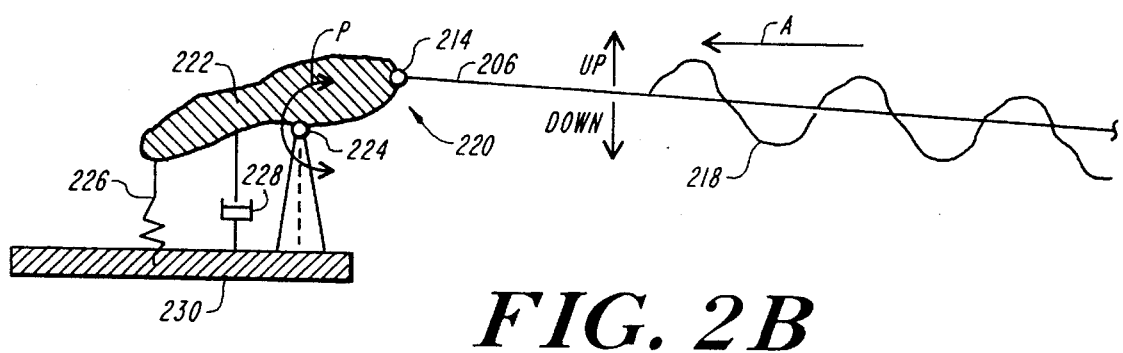
FIG. 2b shows schematically the modeling of an embodiment of the apparatus of the invention in a position moved in a first direction away from a neutral position.
Figure 2C:
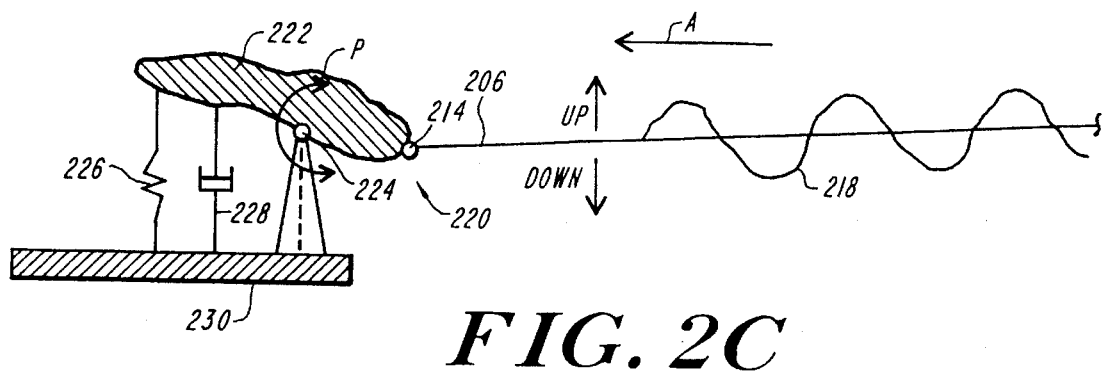
FIG. 2c shows schematically the modeling of an embodiment of the apparatus of the invention in a position moved in a second direction away from a neutral position.

Operation of the apparatus of the invention in a general sense for one degree of rotational freedom is illustrated in FIGS. 2a, 2b, and 2c. Incoming waves cause the link to rotate in the direction of two headed arrow P. The combined effects of the inertia of the link, the spring, the damping elements and the tension in the cable and link cause the apparatus to respond in a frequency dependent fashion, which is governed by the ratio the impedance $Z_m$ of the apparatus 220 in comparison to the impedance $Z_c$ of the cable 206. At some frequencies the response of the device is exactly the same as that of a cable which continues on to infinity. Under these conditions, the device completely absorbs the incoming wave energy, reflecting none. At other frequencies some of the energy will be reflected. The designer must select the properties of the device 220 so as to provide the desired impedance under the anticipated operating conditions.

Figure 2D:
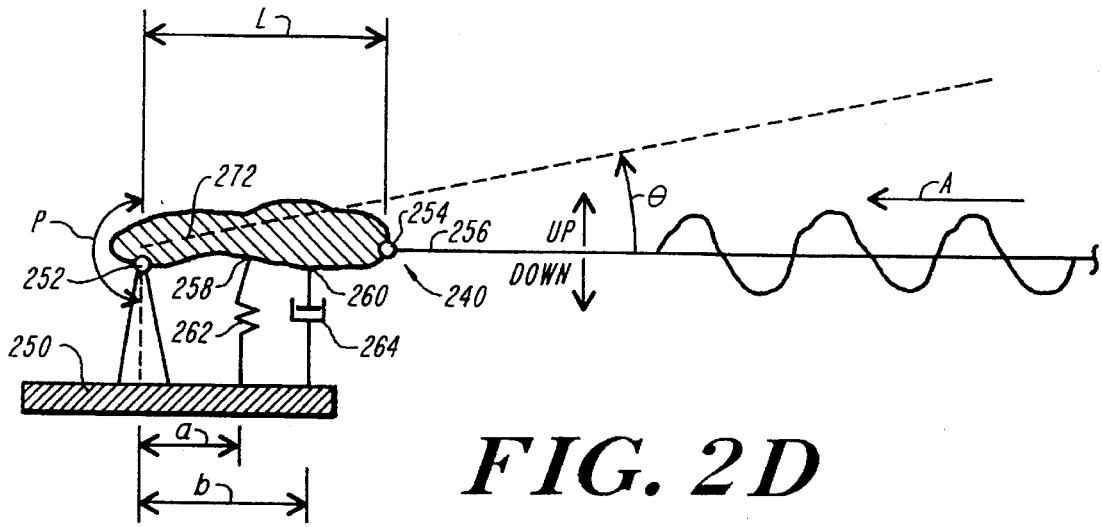
FIG. 2d shows schematically the modeling of a second embodiment of the apparatus of the invention with a different arrangement of the pivot point and damping and spring elements, with the damping and spring elements located between the pivot and the point of attachment to the slender structure.
Figure 2E:
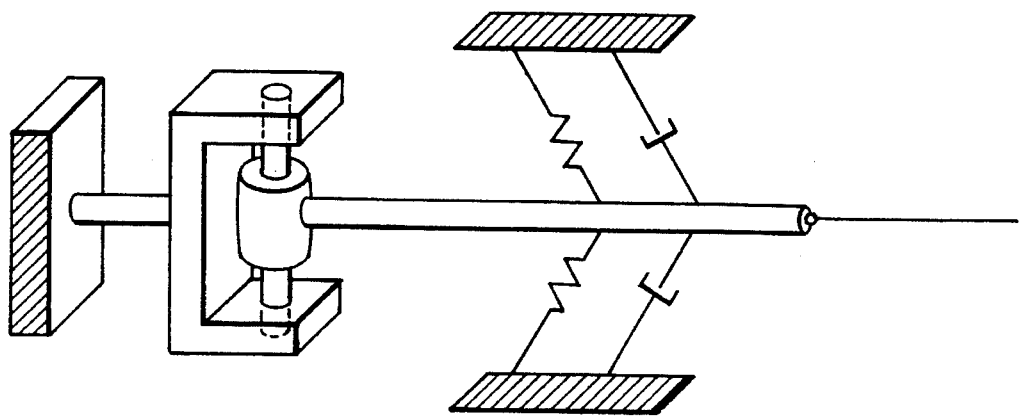
FIG. 2e shows schematically the modeling of an embodiment of the apparatus of the invention accommodating vibration of the tow line in two planes.

An alternative embodiment is shown in FIG. 2d, which is virtually identical to the embodiment shown in FIG. 2a, except that the pivot 252 is at an end of the mass 272 and the spring 262 and damper 264 are between the pivot 252 and the connection 254 to the cable 256.

Figure 2F:
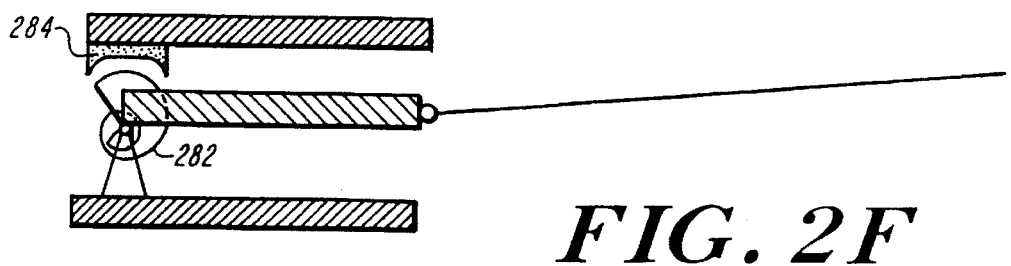
FIG. 2f shows schematically the modeling of an embodiment of the apparatus of the invention using a rotary spring and damper.
Figure 2G:
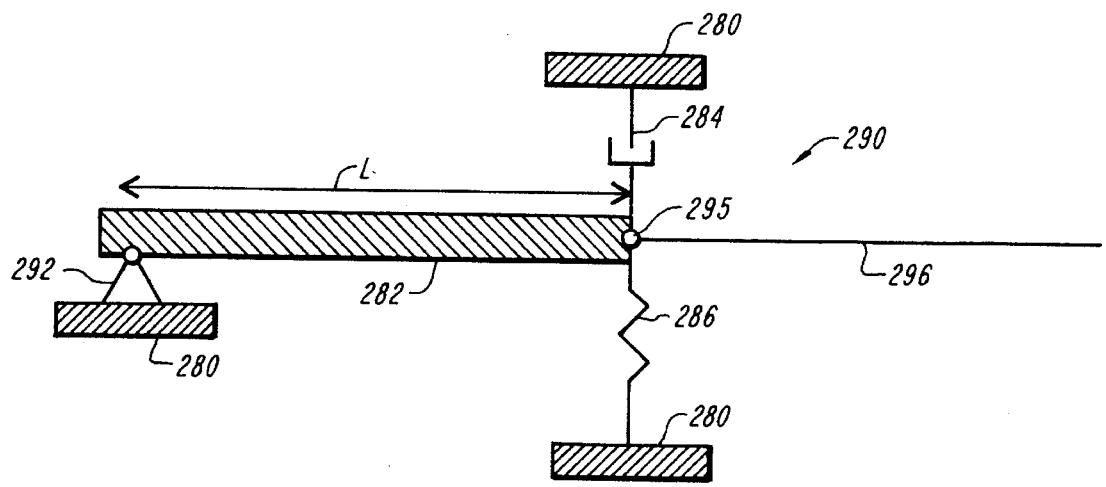
FIG. 2g shows schematically the modeling of an embodiment of the invention with the pivot at one end of the link and the spring and damping elements at the other end, on opposite sides of the link with respect to the direction of vibration of the link.
Figure 2H:
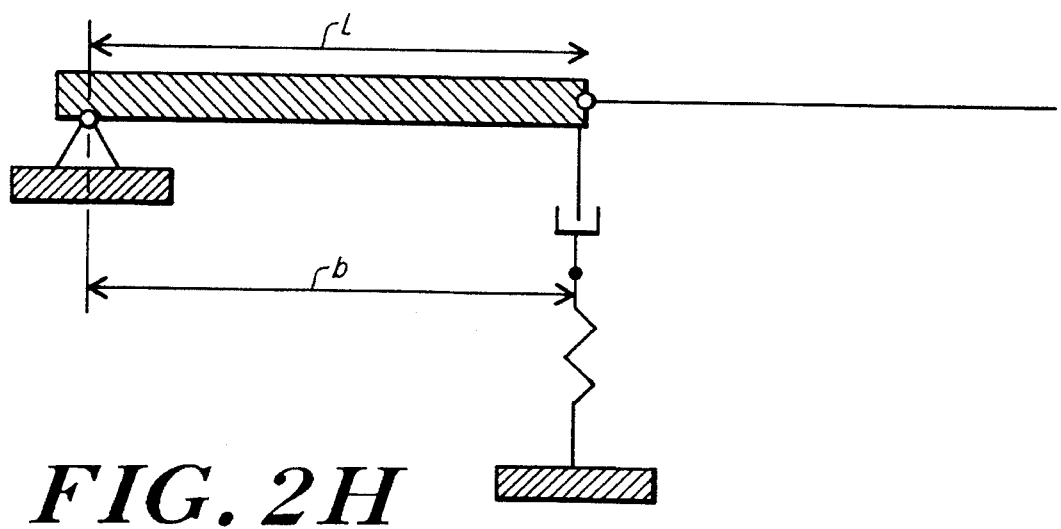
FIG. 2h shows schematically the modeling of an embodiment of the invention with the pivot at one end of the link and the spring and damping elements at the other end, connected in series.

In another preferred embodiment, the spring and damper could also be in the form of a rotational spring 282 and damper 284, as shown in FIG. 2f. The spring constant, $K_\theta$ has the units of N–m/radian and the damper constant, $R_\theta$, is measured in terms of N–m/(radian/s). Such a damper would have an action similar to a disk brake on a car, and the spring would be comparable to a torsion bar.

In another embodiment, the apparatus may be constructed by connecting the spring and damper in series as shown in FIG. 2h. In this embodiment, the expressions describing the device become more complicated, but the basic governing equations for reflection and transmission of waves (Equations 14, 15 and 16 a and b) as given in the next section are valid. In some circumstances, the designer may wish to use this variation of the design, although its performance is generally worse than the case with a parallel spring and damper.

Figure 7A:
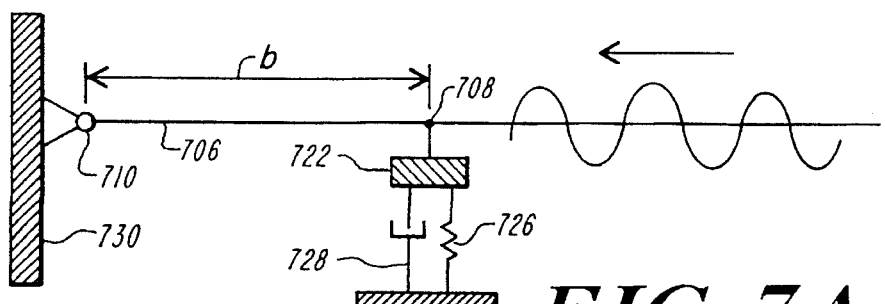
FIG. 7a shows schematically another preferred embodiment of the invention, using a flexible link rather than a rigid link, and a spring and damping element, both having some mass, attached to a fixed reference ground. In another variation, the spring and damping element could be connected in series.
Figure 7B:
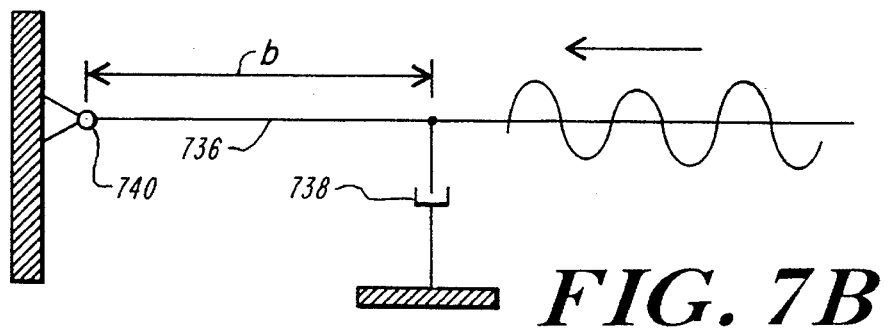
FIG. 7b shows schematically an idealized version of the general case illustrated in FIG. 7a. Practical devices will have some mass and stiffness properties which may have to be accounted for in a precise design analysis.

In yet another alternative design of the apparatus, the pivotable mass link, which has to this point been stipulated to be rigid, may in fact be flexible. A flexible link in combination with a spring and a damper may be used to achieve the same ends, the absorption of incident wave energy. Such an apparatus is shown in FIGS. 7a and 7b. In this case the flexible link 706 is a length of the cable itself. Instead of connecting to a rigid link, the cable 706 connects directly to the reference ground at 730. The spring 726 and damper 728 also connect the cable 706 to ground a distance b from the end of the cable. Thus, the portion of the cable 706 between the connection point to spring 726 and damper 728 and ground at 730 performs the function of the link, such as 222 in FIG. 2a. Because springs and dampers have mass associated with them, their mass 722 is also shown schematically in the diagram as connected to the cable at the point of attachment of the spring and damper. This alternative may also be used to reduce the reflection of energy from the boundary although it will have somewhat different dynamic properties. This variation will be discussed further later.

Mathematical Analysis of the Operation of the Apparatus

The most basic application of the device is when the long slender member analogous to the towline is terminated at a structure that is for all practical purposes unyielding or rigid. Such is the case of a guy wire terminating at a large concrete foundation (FIG. 1c) or a tow line terminating at a large ocean vessel (FIG. 1a). In both cases, the purpose of the invention is to prevent waves traveling along the slender member from being reflected at the termination. This is most easily stated in technical terms by the requirement that the impedance of the termination be equal to the impedance at one end of a sample of the slender member which is of infinite length. The impedance, Z, is defined as the force required to oscillate the structure divided by the velocity of the oscillation at the point of application of the force and in the direction of the force.

$$Z=F/v \qquad (7)$$

For a simple cable or string under axial tension the impedance $Z_c$, as seen at one end of an effectively infinitely long sample is $$Z_c = \sqrt{T\rho_c} = \rho_c C \qquad (8)$$

where

T=tension in the cable $\rho_c$=mass per unit length of the cable and $C=\sqrt{T/\rho_c}$=the speed of propagation of transverse waves in the cable In order to terminate a long slender member at an effectively rigid boundary to prevent reflection of waves back into the member the impedance of the boundary, $Z_m$, should appear to be equal to $Z_c$, the impedance of the long, wave carrying member. The invention accomplishes this by means of a mechanical device which has mass and damping properties and sometimes stiffness properties, which are selected for each application to achieve the desired impedance.

FIG. 2d is a schematic drawing of the apparatus 240 of the invention, which is attached to a rigid surface 250 by a pivot 252. It is also attached to the long slender structural member 256 at another location 254, a distance L from the pivot point 252. Connected at other locations 258 and 260 are a spring 262 and a dashpot (damper) 264 which resist the rotation of the rigid link 272, which has mass moment of inertia $I_o$ with respect to the pivot point.

The equation of motion of this rigid body (and also for the rigid body shown in FIG. 2a) is given by $$I_o\ddot{\theta}+Rb^2\dot{\theta}+(Ka^2+TL)\theta=F(t)L \tag{9a}$$

where $I_o$=mass moment of inertia of the rigid link 272 with respect to the pivot 252 (kg–m$^2$)

K=spring constant (N/m)) of spring 262

R=damping constant (N/(m/s)) of damper 264

L=distance between the connection point 254 of the cable 256 and the pivot 252 (m)

a=distance from the connection 258 of the spring 262 to the pivot 252 (m)

b=distance from the connection 260 of the damper 264 to the pivot 252 (m)

θ=angle of rotation of the rigid link 272 about pivot 252

F(t)=applied transverse force at the point of connection 254 to the cable 256.

If a rotational damper and spring, such as shown at FIG. 2f, at 284 and 282 respectively) are used, the equivalent equation of motion would require the following substitutions in Eq. 9a: $Rb^2=R_\theta$ and $Ka^2=K_\theta$, yielding:

$$I_o\ddot{\theta}+R_\theta\dot{\theta}+(K_\theta+TL)\theta=F(t)L \tag{9b}$$

The impedance, $Z_m$, of the device 240 as evaluated at the attachment point 254 of the cable 256 is given by $$Z_m=\overbrace{\left(\frac{Rb^2}{L^2}\right)}^{\text{real}}+i\overbrace{\left(\frac{I_o\omega}{L^2}-\frac{Ka^2+TL}{\omega L^2}\right)}^{\text{imaginary}} \tag{10a}$$

(or in the case of rotational elements by:

$$Z_m=\overbrace{\left(\frac{R_\theta}{L^2}\right)}^{\text{real}}+i\overbrace{\left(\frac{I_o\omega}{L^2}-\frac{K_\theta+TL}{\omega L^2}\right)}^{\text{imaginary}}, \tag{10b}$$

where $\omega=\dot{\theta}$, the time rate of change of θ.

The remaining discussion will be for the set up shown in FIG. 2d in terms of R and K but no loss of generality is implied. The impedance has real and imaginary components as indicated. The impedance $Z_c$ of an infinitely long cable, as given by $Z_c=\rho_cC$, (eq. 8) has, by contrast a real but no imaginary part. In order that waves not be reflected it is required that $Z_m=Z_c$. This means $Z_m$ must have no imaginary component. Therefore $$\left(\frac{I_o\omega}{L^2}-\left(\frac{Ka^2+TL}{\omega L^2}\right)\right)=0 \tag{11}$$

which may be solved for the frequency ω which satisfies the equation $$\omega^2=\frac{Ka^2+TL}{I_0}=\Omega^2 \tag{12}$$

This is the particular frequency of motion of the link 272 at which the device can be made to function perfectly and it shall be defined as ω. The device can be made to function reasonably well at frequencies near to this frequency as will be shown.

First, it is necessary to understand the real part of the impedance. Ideally, the cable impedance should equal the real part of the termination impedance. Combining Equations (8) and (10a) provides $$\frac{Rb^2}{L^2}=\rho_cC=\sqrt{T\rho_c}\; . \tag{13}$$

For a given cable with tension T and mass per unit length $\rho_c$, the designer of the termination must select R, L, and b to achieve the desired result.

A measure of the performance of the device may be evaluated in terms of reflection or transmission coefficients. The reflection coefficient is the ratio of the magnitude squared of a sinusoidal wave reflected from a boundary to the magnitude squared of the incident wave. If B is defined as the reflected wave amplitude and A as the incident wave amplitude, then the reflection coefficient $R_p$ is given by $$R_p=\frac{|B|^2}{|A|^2}=\frac{\text{reflected wave energy}}{\text{incident wave energy}} \tag{14}$$

The transmission coefficient is $$T_p=1-R_p=\frac{\text{transmitted wavw energy}}{\text{incident wave energy}} \tag{15}$$

These values may also be given in terms of the impedance of the cable and the impedance of the boundary apparatus of the invention, by making the following substitution for B and A in terms of the impedances.

$$R_p=\frac{|B|^2}{|A|^2}=\frac{|Z_c-Z_m|^2}{|Z_c+Z_m|^2}=\frac{\left|1-\frac{Z_m}{Z_c}\right|^2}{\left|1+\frac{Z_m}{Z_c}\right|^2} \tag{16a}$$

The transmission coefficient is $$T_p=1-\frac{\left|1-\frac{Z_m}{Z_c}\right|^2}{\left|1+\frac{Z_m}{Z_c}\right|^2}\; . \tag{16b}$$

As stated previously, it is desirable to have the impedance of the cable $Z_c$ and the boundary apparatus of the invention $Z_m$ be equal. When this is true, the reflection coefficient is zero and the transmission coefficient is one. In any practical device it will often be necessary for the device to operate under conditions for which it is not optimally adjusted. In the case that one is terminating a cable to a rigid boundary, the off optimum conditions are those for which the incoming wave frequency, which depends on external excitation, such as vortex shedding, is not equal to Ω (therefore giving rise to an imaginary component in the impedance $Z_m$ of the apparatus of the invention) or the real part $Rb^2/L^2$ of the invention's impedance $Z_m$ is not equal to the cable's impedance $Z_c=\rho_c C$. The designer would attempt to select the mechanical properties of the device to minimize wave reflection, even under non-optimum conditions. In part, the designer must attempt to maintain the difference between the real part $Rb^2/L^2$ of the invention's impedance $Z_m$ and the cable's impedance $Z_c=\rho_c C$ within a preselected degree of deviation. In addition, the impact of the imaginary components of the impedances must be dealt with. The following analysis provides a more precise examination the performance of the device under non-optimum conditions.

$R_p$ and $T_p$ can be expressed in terms of $Z_m/Z_c$ the ratio of the impedance of the apparatus to that of the long member as shown above. In the case of the apparatus shown in FIG. 2d and a cable, this ratio is given by $$\frac{Z_m}{Z_c} = \left[\frac{Rb^2}{\rho_c CL^2}\right] + i\left[\frac{I_o\Omega}{\rho_c CL^2}\right]\left[\frac{\omega}{\Omega}\left(1 - \frac{\Omega^2}{\omega^2}\right)\right] \quad (17)$$

$$= \gamma + i\beta\left(\frac{\omega}{\Omega} - \frac{\Omega}{\omega}\right)$$

This expression has three dimensionless groups which characterize the behavior of the apparatus. The three groups are defined as:

$$\gamma = \frac{Rb^2}{\rho_c CL^2} \quad (17a)$$

$$\beta = \frac{I_o\Omega}{\rho_c CL^2}$$

$$\frac{\omega}{\Omega}.$$

If the ratio $Z_m/Z_c$ equals 1, the device is optimized. The ratio equals 1 if the real part, $\gamma$ equals 1 and the imaginary part $$\beta\left(\frac{\omega}{\Omega} - \frac{\Omega}{\omega}\right)$$

equals 0. If these ideal relationships are absent, (which will typically be the case) the designer can optimize the situation by analyzing the transmission coefficient from equation 16b.

The transmission coefficient may be rewritten in terms of these three groups as follows:

$$T_p = \frac{4\gamma}{\left[(1+\gamma)^2 + \beta^2\left(\frac{\omega}{\Omega} - \frac{\Omega}{\omega}\right)^2\right]}. \quad (18)$$

Figure 5A:
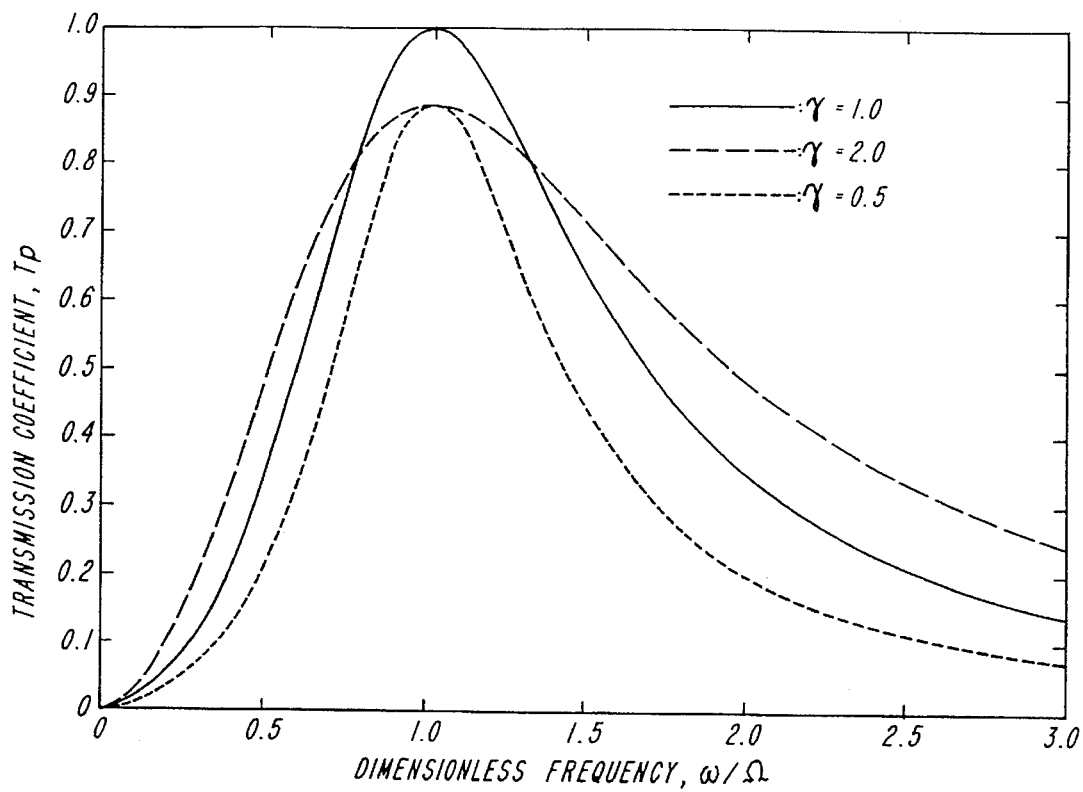
FIG. 5a shows graphically the relationship between the transmission coefficient $T_p$ on the one hand, and the ratio of $\omega/\Omega$ on the other hand, for different values of the parameter $\gamma$, which depends on the properties of the damping element in the invention and the linear density $\rho_c$ of the slender structure and the tension T in the slender structure. The parameter $\beta$ is held constant.

The reflection or transmission coefficient can be portrayed in simple diagrams as functions of these three groups. This is done in FIGS. 5a and 5b for the transmission coefficient for the embodiment of the invention shown in FIGS. 2a, 2b, 2c, 2d, 2e, 2f and 2g. FIG. 5a is the transmission coefficient $T_p$ for the invention plotted as a function of $\omega/\Omega$, the ratio of the actual incoming wave frequency to the ideal value (giving rise to no imaginary impedance component), for different values of $\gamma$, the ratio of the actual real or resistive damping component of the boundary impedance to the ideal value $\rho_c C$, which are parameters wholly controllable by the designer. The dimensionless group defined as $\beta$ is held constant in this figure with a value of 1.83.

Only when $\gamma$ is 1.0 (shown in solid line) (corresponding to the real part of the impedance $Z_m$ being equal to the impedance of the towline) and $\omega/\Omega$ is also 1.0 (corresponding to there being no imaginary component to the impedance $Z_m$), does the transmission coefficient equal the optimum value of 1.0. When these conditions are not met then some of the wave energy will be reflected back into the cable.

However, the figure does reveal that it is better to err on the side of too large a value of $\gamma$, (shown in dashed line) or too much damping rather than too little (shown in dotted line). With too much boundary damping the peak is much broader than when there is too little damping. When $\gamma$ is 2.0, a factor of two greater than optimum, $T_p$ decreases from 1.0 at the peak to approximately 0.87, and at the same time $T_p$ is greater than it would be for $\gamma=1.0$ over a wide range of frequencies away from the peak (i.e. $0.75>\omega/\Omega>1.4$). Typically, it is preferred that $T_p$ be as large as possible over a broad range of frequency, so that more of the wave energy is transmitted into the apparatus, with less being reflected back into the cable. When $\gamma$ is 0.5, a factor of two too small, $T_p$ is less, at all frequencies as compared to $T_p$ when $\gamma=1.0$. Thus, for too little damping, more wave energy would be reflected back into the cable, at off optimum values of $\omega/\Omega$. Thus, a beginning point for the designer in optimizing the apparatus would be to attempt to keep $\gamma$ within a preselected deviation from 1, which corresponds to keeping $Rb^2/L^2$ within a preselected degree of deviation from the value of $\rho_c C$. Further, as mentioned above, it is better for $\gamma$ to be greater than, rather than less than 1.

Figure 5B:
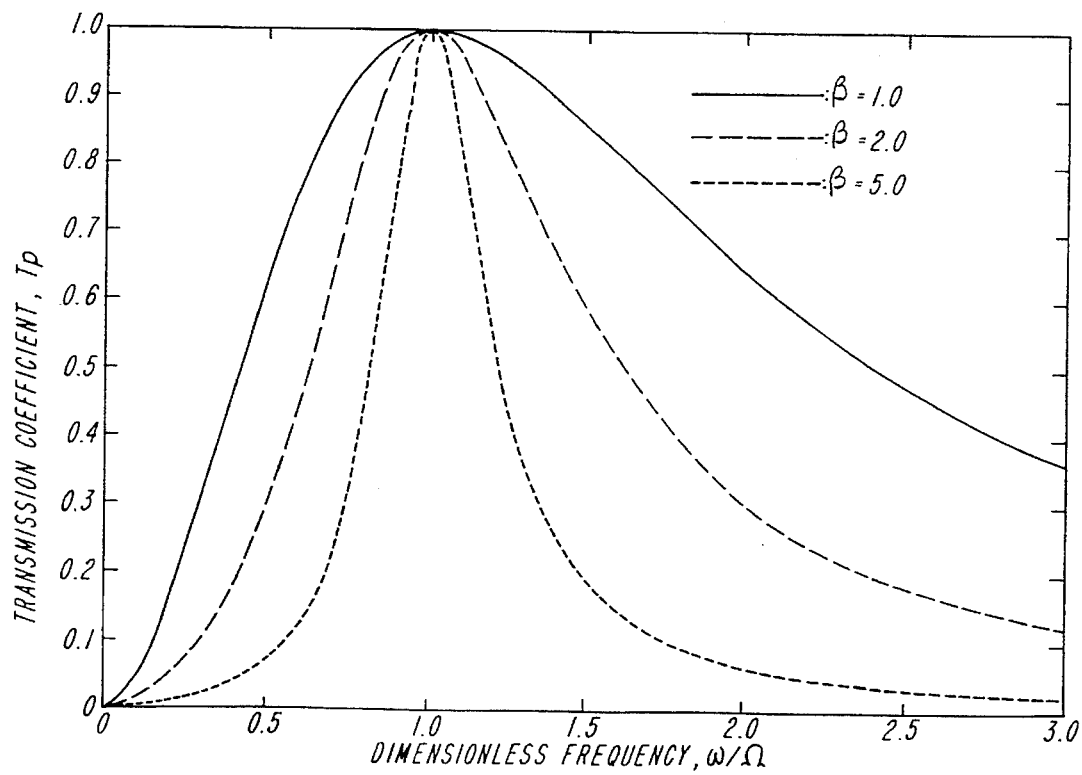
FIG. 5b shows graphically the relationship between the transmission coefficient Tp on the one hand, and the ratio of $\omega/\Omega$ on the other hand, for different values of the parameter $\beta$, with the parameter $\gamma$ held constant.

As shown in FIG. 5b, for constant values of $\gamma$, the width of the peak in the $T_p$ versus $\omega/\Omega$ curve depends on the parameter $\beta$ (also a parameter controllable by the designer). The physical interpretation of this parameter is not immediately obvious. However, examining the following basic case provides some insight. As shown in FIG. 2g, when the link 282 is a uniform bar of length L and mass per unit length $\rho_L$, with the pivot 292 at one end and the cable 296 connected at the other 295, the parameter $\beta$ reduces to:

$$\beta = \frac{I_o\Omega}{\rho_c CL^2} = \left(\frac{2\pi}{3}\right)\frac{\rho_L L}{\rho_c \lambda_\Omega} \quad (19)$$

The ratio $\rho_L L/\rho_c \lambda_{106}$ is the ratio of the mass of the link compared to the mass of a section of the cable one wavelength long ($\lambda_\Omega$) at the frequency $\Omega$ or $\omega/\Omega=1.0$. The behavior of the transmission coefficient as a function of $\beta$ is shown in FIG. 5b. It reveals in essence, that in order to have the peak be as broad as possible, it is necessary that $\beta$ be small (indicated by the solid line), suggesting that terminations having a small mass per unit length, in comparison to the mass per unit length of the cable, will perform better than large massive ones.

Since there are at least six variables that can be adjusted with respect to the apparatus of the invention (220 in FIG. 2a) (k, R, a, b, L and $I_o$), the designer can adjust $\gamma$, $\beta$, and $\omega/\Omega$ to achieve the desired boundary impedance characteristics. Thus, consideration of FIGS. 5a, and 5b shows how one may alter parameters to design an apparatus, or to adjust an adjustable apparatus to changing conditions, such as increased boat speed or current, change of load mass, change of tow line properties, depending on the application.

The apparatus of the invention can be constructed with elements having variable spring and damping properties, and a variable (i.e. movable) pivot point for the pivoting mass, or a variable connection point for the cable to the mass. These adjustments can be static, i.e. set for expected load conditions and left to remain there (permanently or until load conditions are expected to change), or they can be dynamic. If the adjustments are dynamic, they can be manually controlled, or can be automatically controlled using appropriate sensors and a control system. Either a mechanical or a computer operated control system could be used, and both are intended to be within the coverage of the claims.

When the damping element and the spring are connected in series as shown in FIG. 2h, the expression for the impedance $Z_m$ and optimum operating frequency $\Omega$ are given by:

$$Z_m = \frac{Rb^2}{L^2(1+\mu^2)} - i\left[\frac{TL-\omega^2 I}{\omega L^2} + \frac{Rb^2\mu}{L^2(1+\mu^2)}\right] \quad (20a)$$

$$\Omega^2 = \frac{1}{2}\left\{\frac{TL+Kb^2}{I} - \left(\frac{K}{R}\right)^2 + \sqrt{\left[\frac{TL+Kb^2}{I} - \left(\frac{K}{R}\right)^2\right]^2 + 4\left(\frac{K}{R}\right)^2\frac{TL}{I}}\right\} \quad (20b)$$

and $$\mu = \frac{\omega R}{k} \quad (20c)$$

These expressions may be used to evaluate the reflection and transmission coefficients as specified in equations 14, 15, 16a and 16b.

The invention has been discussed only with respect to an embodiment between the end of the tow line 206 and a very large ship or stationary foundation such as is shown at the ship end of cable 106 in FIG. 1a, or the foundation end of cable 146 in FIG. 1e. That stationary element has been referred to as the "ground" in the preceding discussion. The invention is also applicable to other applications where the termination point of the cable or slender structure is capable of some motion. Such a structure is referred to, in the following discussion, as a movable body. Two examples are considered here. The first is the case of a finite sized object being attached at the end of a cable. Such an object might be suspended at the end of a cable, as for example, an instrument package being towed behind a ship, as shown in FIG. 1a or the object might be a buoy 124 at the top of a cable 126, as shown in FIG. 1b.

The second alternative application is that of an essentially rigid body connected to a long cable at an intermediate location, not at either end, as shown in FIG. 1d.

The means of applying the invention in these two alternative cases is nearly identical to that already explained for making terminations at the end of a cable to a fixed object. Equations 15 and 16 express the reflection and transmission coefficients in terms of the impedance of the cable and the object to which it is connected. This expression is completely general and applies to these new cases as well. The impedance $Z_c$ is a property of the long structure which carries the waves to the boundary. The impedance $Z_m$ pertains to the impedance looking into the boundary including the effects of the invention, the movable body to which it is attached, and the effects of the cable attached to the other side of the movable body.

Figure 6A:
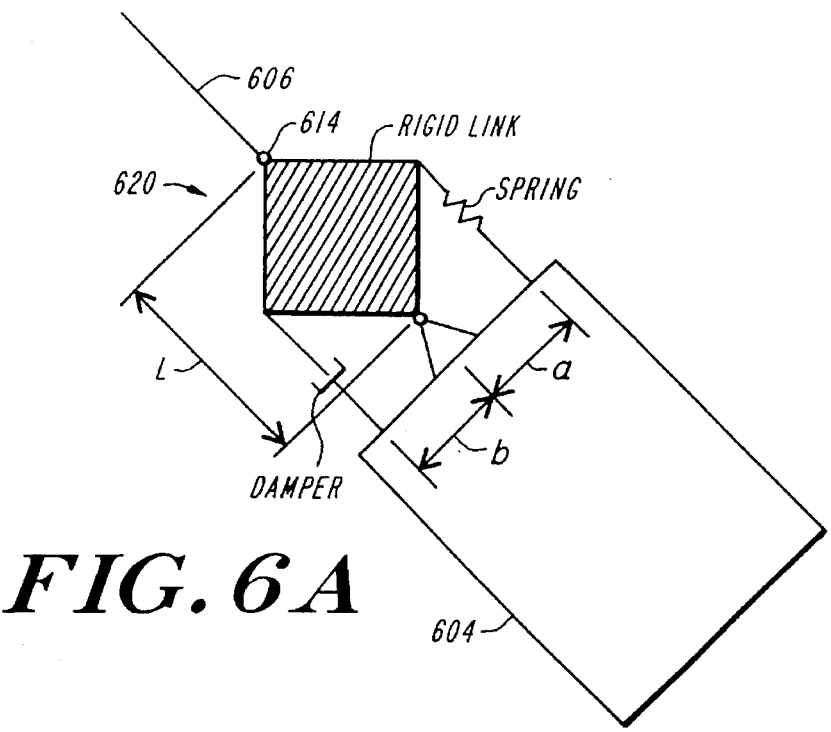
FIG. 6a shows schematically a preferred embodiment of the invention, using a generally rigid mass, and spring and dissipative elements, for use connected to a movable reference object.

For example FIG. 6a illustrates a towed object 604 at the end of a cable 606 with the apparatus of the invention 620 connecting the two. The designer must evaluate the impedance $Z_m$ at the point 614 of attachment to the invention 620. However, since the reference object 604 is movable, the impedance function depends not only on the properties of the apparatus of the invention 620, but also on the dynamic properties of the attached mass 604. The result will be more complicated than that found in Equation 10, which was for attachment to a stationary ground, such as a ship or foundation, but it is well within the capability of an engineer of ordinary skill in the art of vibration control. If in such a case one were to plot the transmission coefficient, the result would have more than one peak in it, in contrast to the simple case with the invention attached to a stationary boundary as evaluated in FIGS. 5a and 5b.

The designer has a variety of possible objectives to choose from in such an application. He may wish to have the apparatus of the invention absorb as much energy as possible, thus having a very low reflection coefficient. He may, on the other hand, wish to minimize the motion of the towed movable body, which would yield a different set of criteria for the reflection or transmission coefficients. By properly sizing the inertia, stiffness, and damping properties of the apparatus, he may be able to achieve his desired ends.

Figure 6B:
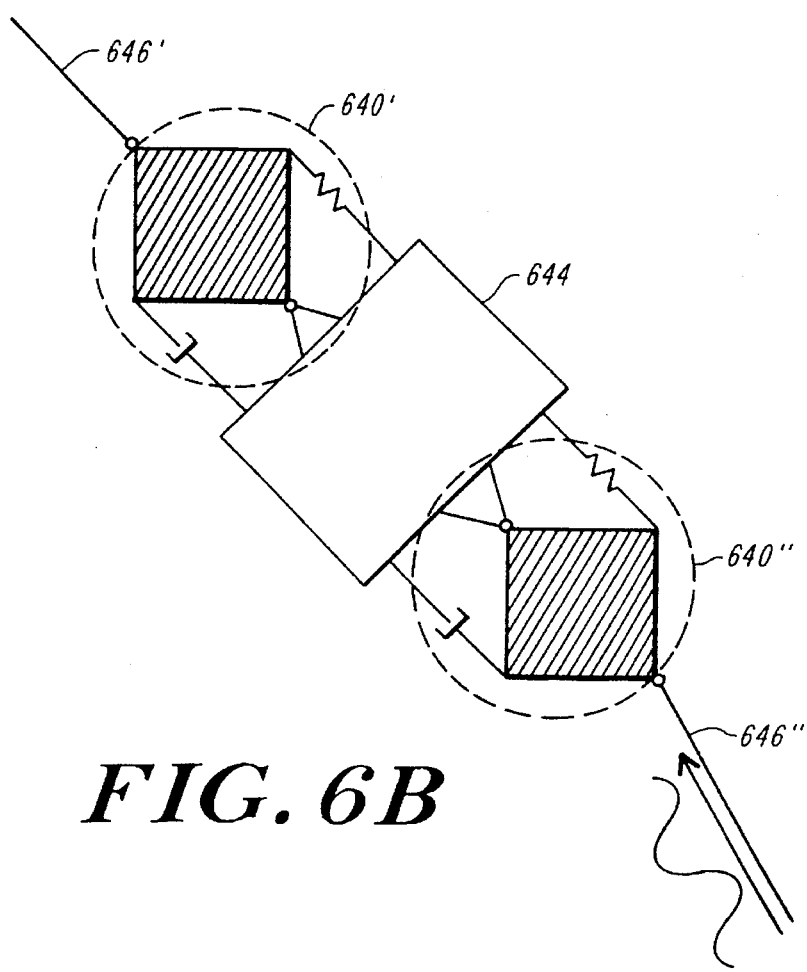
FIG. 6b shows schematically another preferred embodiment of the invention, with two instances of the invention securing two lengths of slender cable on either side of a movable body.

FIG. 6b shows the situation with a movable body 644 located at an intermediate point in a cable system. Assume for the sake of example that waves are being generated somewhere to the right of the reference object 644 as shown and are traveling to the left toward the object. If the designer wants the waves to be reflected by the reference object 644, thus isolating the region to the left from vibration, then he would design the apparatus of the invention 640' and 640" connecting the cables 646' and 646" on both sides of the reference object so that the reflection coefficient for waves traveling to the left will be a maximum. Equations 16a and b holds $Z_c$ is the impedance of the cable to the right and $Z_m$ is the combined impedance of the components of the apparatus of the invention, as attached to both ends of the reference object, the object, and the cable to the left of the object. Although the result might appear to be mathematically complicated, it may be calculated by standard engineering techniques known to those of ordinary skill in the art. The designer selects the mechanical properties of the apparatus to provide the desirable wave reflection, transmission and absorption properties to the system.

A typical oceanographic data collection mooring may have several instrument packages (analogous to the movable body) distributed along a mooring cable. Each instrument package may use the invention attached at one or both ends to give the mooring the desired wave propagation properties. The basic design of the apparatus will not change. It will consist of a link (rigid or perhaps flexible) pinned at one point to a reference body, i.e., the oceanographic instrument and attached at another to the long slender member. Spring and damper components will also be used, normally operating in parallel between the rigid link and the reference body to give the apparatus the desired impedance. The designer will size the components to achieve the desired results. If a flexible link is used the spring element may be omitted and the apparatus may include simply a damper connected as shown in FIG. 7b.

This particularly useful embodiment of the invention having relatively few parts is shown in FIG. 7a. In this embodiment, the link is not rigid and is simply a section 706 of cable which continues from the point of attachment 708 of the assembly made up of the spring 726, mass 722 and damper 728 to what has previously been referred to as the pivot. The pivot is in this embodiment, simply the point 710 at which the cable 706 connects to a reference body, i.e., to the ship or non-moving foundation 730.

The simplest application in mathematical terms is the case that the apparatus is connected to a non-movable boundary. This case is described below as an example. This form of the invention may in some circumstances be used to prevent reflection from non-moving boundaries. Equation 16a, defining the reflection coefficient in terms of the ratio of the boundary impedance, $Z_m$, to the impedance of the cable, $Z_c$, is valid for this application. This ratio $Z_m/Z_c$ is given by:

$$\frac{Z_m}{Z_c} = \frac{R}{\rho_c C} + i\left[\frac{wm}{\rho_c C} - \left(\cot\left(\frac{\omega b}{C}\right) + \frac{K}{\rho_c C\omega}\right)\right], \quad (21)$$

where m is the mass of the damping element.

As before, if minimum reflection at the boundary is desired, the designer would like the imaginary part of this expression to be zero and the real part to be 1.0. A simple numerical example is presented here to illustrate the general behavior of this type of apparatus. The example is of a simple damper only 728, with negligible mass, as shown connected to the cable 736 in FIG. 7b, at a distance b from the cable termination point 740. No spring is present. This simplified version has the best wave absorption properties if the link is flexible. For this case (m and K=0) the ratio $Z_m/Z_c$ takes on the following form:

$$Z_m/Z_c = R/\rho_c C - i\cdot\cot(\omega b/C). \quad (22)$$

The cotangent function takes on zero values at frequencies associated with wavelengths λ which satisfy the relationship $$4b/\lambda = 1, 3, 5 \ldots \quad (23)$$

In other words, the distance b is exactly an odd multiple of quarter wavelengths. When this is satisfied it is possible to have the boundary impedance exactly match the cable impedance, with the result that no waves will be reflected.

Figure 8:
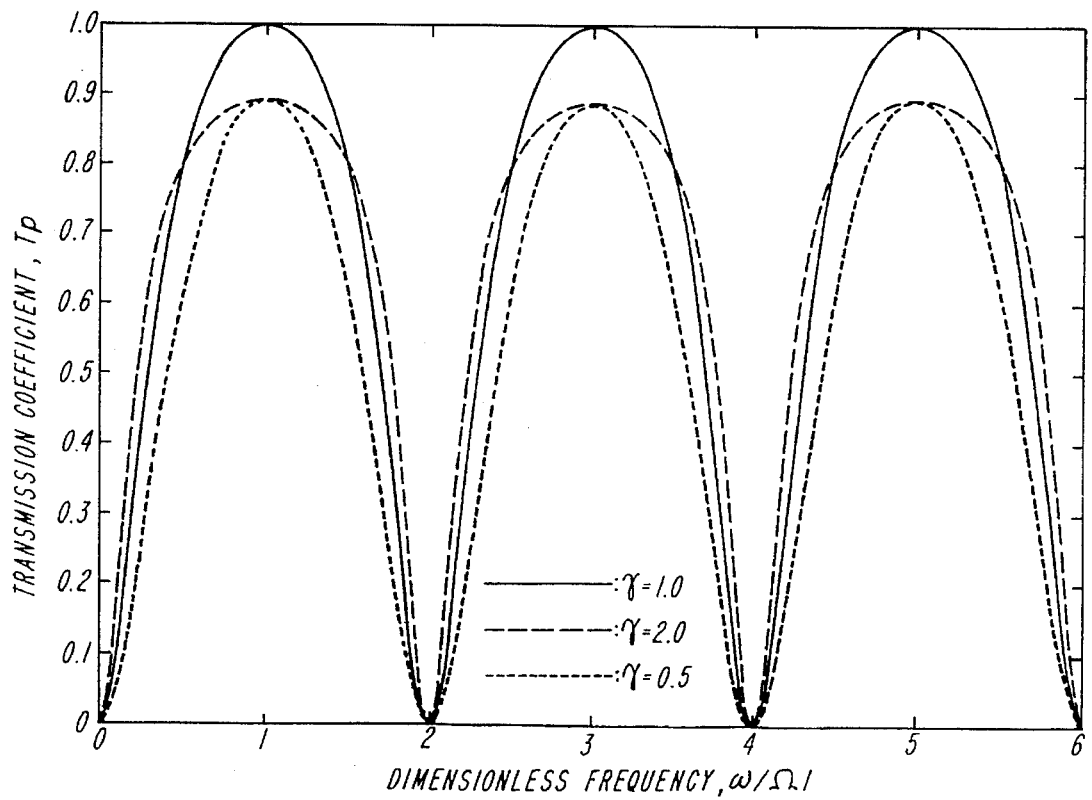
FIG. 8 shows graphically the relationship between the transmission coefficient $T_p$ on the one hand, and the ratio of $\omega/\Omega_1$ on the other hand, for the embodiment shown in FIG. 7b, for different values of the parameter $\gamma$, which depends on the properties of the damping element in the invention and the linear density $\rho_c$ of the slender structure and the tension T in the slender structure. The parameter $\beta$ is held constant.

FIG. 8 shows the transmission coefficient as a function of dimensionless frequency for this case. The dimensionless frequency is defined as $$\omega/\Omega_1 = \omega/(\pi C/2b) = 4b/\lambda \quad (24)$$

The results are plotted for different values of γ, the ratio of the damping coefficient R to $\rho_c C$. When this ratio is 1.0 (solid line) and the dimensionless frequency $\omega/\Omega_1$ is an odd integer, then the transmission coefficient is 1.0. When γ is greater (dashed line) or less (dotted line) than 1.0, the optimum transmission coefficient is reduced. As in the case of the rigid link, it is better to err on the side of having the damper be too strong (i.e. γ greater than 1.0) rather than too weak, because this broadens the transmission coefficient curve for non-optimum values of the frequency ratio.

It should be understood that the schematic representations of the apparatus of the invention shown in the figures are general schematics showing how an apparatus of the invention can be modeled. The apparatus of the invention is not limited to those separate elements of a mass pinned to a reference (ground or movable) and a spring in parallel with a damping element. Thus, the invention contemplates any apparatus that can be modeled as a rigid or flexible mass pinned to a reference (movable or ground) which moves in response to incoming waves. Separate or combined spring and damping elements are attached to the mass and also to the object on which the invention is mounted. The object to which the invention is attached is sometimes movable and sometimes not. The spring and damper assemblies may be attached between the mass link and the reference object or ground at single points or the attachment may be distributed along the link, like a piece of rubber or other elastomeric compound with spring and damping properties.

The motion of the link has been referred to as a "pivoting" motion, implying that there is no torque or moment transmitted between the reference ground and the link. This is the ideal case. The invention will also work with what is known as a "flex joint," which is a bending joint, rather than a pivoting joint. In a flex joint, although the link is clamped to the reference body, the connection is flexible about the point of connection. The bending stiffness is small within ranges of motion normally expected, and further, the joint undergoes such flexing without failure. Such a joint is commonly modeled as a pivot. The pivot and the flex joint are referred to collectively as "hinged joint." The link may have one to three degrees of rotational freedom, and springs and dampers can be provided to resist rotation through each degree.

In the actual device it is not necessary for the spring or the damper to be perfectly linear. Linear behavior does simplify the design and analysis. In some cases the design study may have to be done experimentally to overcome especially strong non-linear behavior. In many cases equivalent linear models will work adequately for design purposes.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. An apparatus for connecting a slender structure, which is subject to transverse vibration, to a reference body, the apparatus comprising:
   a. a link:
      i. that is connected at a first point of the link to a first end of the slender structure;
      ii. that is connected with a hinge at a second point of the link to the reference body with at least one degree of rotational freedom; and
      iii. that is connected to said slender structure and said hinge such that:
         (a). the link is movable through said at least one degree of freedom in response to a moment about the hinge caused by a change in the angle of incidence between said link and said slender structure; and
         (b). transverse vibration is transmitted directly from said slender structure to said link; and
   b. connected between the link at a third point and the reference body, means for generating a damping force that damps motion of the link through at least one of the link's degrees of rotational freedom, said damping force being a function of the velocity of said third point relative to said reference body.

2. The apparatus of claim 1, wherein the link comprises a substantially rigid link.

3. The apparatus of claim 2, wherein the link is connected with a hinge to the body with at least two degrees of rotational freedom.

4. The apparatus of claim 2, the means for damping comprising a rotary means for damping motion.

5. The apparatus of claim 2, further comprising, connected between the link and the reference body, a means for applying a spring stiffness resisting motion through at least one of the link's degrees of rotational freedom.

6. The apparatus of claim 5, wherein the means for damping motion and the means for applying a spring stiffness operate in parallel between the link and the reference body.

7. The apparatus of claim 6, the means for applying a spring stiffness comprising a rotary means for applying spring stiffness.

8. The apparatus of claim 6, further comprising, connected between the link and the reference body, a means for damping motion of the link through at least one additional degree of freedom of the link.

9. The apparatus of claim 5, wherein the means for damping motion and the means for applying a spring stiffness operate in series between the link and the reference body.

10. The apparatus of claim 9, the means for applying a spring stiffness comprising a rotary means for applying spring stiffness.

11. The apparatus of claim 9, further comprising, connected between the link and the reference body, a means for damping motion of the link through at least one additional degree of freedom of the link.

12. The apparatus of claim 1, the link comprising a substantially flexible link.

13. The apparatus of claim 12, where the link is connected with said hinge to the body with at least two degrees of rotational freedom.

14. The apparatus of claim 12, the means for damping comprising a rotary means for damping motion.

15. The apparatus of claim 12, further comprising, connected between the link and the reference body, a means for applying a spring stiffness resisting motion through at least one of the link's degrees of rotational freedom.

16. The apparatus of claim 15, wherein the means for damping motion and the means for applying a spring stiffness operate in parallel between the link and the reference body.

17. The apparatus of claim 16, the means for applying a spring stiffness comprising a rotary means for applying spring stiffness.

18. The apparatus of claim 16, further comprising, connected between the link and the reference body, a means for damping motion of the link through at least one additional degree of freedom of the link.

19. The apparatus of claim 15, wherein the means for damping motion and the means for applying a spring stiffness operate in series between the link and the reference body.

20. The apparatus of claim 19 the means for applying a spring stiffness comprising a rotary means for applying spring stiffness.

21. The apparatus of claim 19, further comprising, connected between the link and the reference body, a means for damping motion of the link through at least one additional degree of freedom of the link.

22. The apparatus of claim 1, wherein the reference body comprises a substantially stationary body in response to vibration in the slender structure.

23. The apparatus of claim 1, wherein the reference body comprises a substantially movable body in response to vibration in the slender structure.

24. The apparatus of claim 1, wherein the hinged connection comprises a pivot.

25. The apparatus of claim 1, wherein the hinged connection comprises a flex joint.

26. The apparatus of claim 24, further comprising, connected in parallel with said damping means, between the link and the reference body, a means for applying a spring stiffness resisting motion through at least one of the link's degrees of rotational freedom.

27. The apparatus of claim 24, further comprising, connected in series with said damping means, between the link and the reference body, a means for applying a spring stiffness resisting motion through at least one of the link's degrees of rotational freedom.

* * * * *

UNITED STATES PATENT AND TRADEMARK OFFICE
CERTIFICATE OF CORRECTION

PATENT NO. : 5,526,906
DATED : June 18, 1996
INVENTOR(S) : Vandiver et al.

It is certified that error appears in the above-indentified patent and that said Letters Patent is hereby corrected as shown below:

Cover page, item [21], correction of application number from 343,795 to 343,792 to read:

"Appl. No.: 343,792"

Signed and Sealed this

Twenty-eighth Day of January, 1997

Attest:

BRUCE LEHMAN

Attesting Officer    *Commissioner of Patents and Trademarks*